May 9, 1961 S. W. BONE 2,983,187
TICKET MACHINE
Filed March 2, 1956 9 Sheets-Sheet 1

INVENTOR.
Sidney W. Bone
BY:
Olson & Trexler
Attys.

May 9, 1961  S. W. BONE  2,983,187
TICKET MACHINE
Filed March 2, 1956  9 Sheets-Sheet 2

INVENTOR.
Sidney W. Bone
BY
Olson & Trexler
Attys

May 9, 1961   S. W. BONE   2,983,187
TICKET MACHINE

Filed March 2, 1956   9 Sheets-Sheet 3

INVENTOR.
Sidney W. Bone
BY
Olson & Trexler
attys.

INVENTOR.
Sidney W. Bone
BY
Olson & Trexler
attys

United States Patent Office 2,983,187
Patented May 9, 1961

2,983,187

TICKET MACHINE

Sidney W. Bone, 909 Colfax, Evanston, Ill.

Filed Mar. 2, 1956, Ser. No. 569,035

15 Claims. (Cl. 88—24)

This invention relates to apparatus and methods for producing tickets by photographic means.

In the processing of persons or commodities in commerce and industry it is frequently desirable that a ticket be provided representative of the operations or processing to be conducted.

For example in the transportation field, it is conventional to provide a ticket sold to and accompanying the person or article to be transported. Preferably this ticket may comprise a plurality of separable sections, the various sections being severed and retained by the various processing carriers, for accounting purposes.

In conventional practice, for example in the railroad or other transportation field, it has been customary to provide a large number of different tickets printed up in advance, and carrying indicia representative of and corresponding to the various routes and stations to be travelled. This practice requires the storage of a large number of different tickets, leading to storage problems and accounting difficulties, inasmuch as the preprinted tickets may become lost or misplaced, or misappropriated. Further, vigilance is required to insure that a supply of each kind of ticket will be available in requisite quantities. Due to these difficulties, in conventional practice it is customary to limit the number of different preprinted tickets, and to use instead blank tickets with the various stations and routings written in. This in turn leads to problems in cost accounting between the various carriers involved in the transaction.

In accordance with the present invention rapidly operable means and methods are provided for effecting the production of any one of a number of different tickets, photographically. The tickets are reproduced, as occasion requires, from a storage reservoir carrying indicia for a large number of different ticket combinations. Due to the large number of different combinations thus rendered available, it is possible to provide a special ticket for substantially all routings which may be employed, thus minimizing the use of "write in" blank tickets, with their incident cost accounting difficulties.

Further, in accordance with the invention, in addition to the ticket which accompanies the passenger or article to be transported, there is a tally sheet provided which may be either in continuous strip or separable card form, and which is preferably of punched card character; and which may be used for rapid cost accounting purposes; as will more particularly hereinafter appear. This is an important aspect of the invention as it provides a material simplification of cost accounting procedures.

The principal object of the invention is to effect the foregoing, in a practical and expeditious manner; and various more specific objects, advantages and features of the invention will be apparent from the following specification, wherein one preferred embodiment is set forth for purposes of illustration. In such embodiment the invention has been shown as applied to a ticket producing machine, for use specifically in the railroad transportation of passengers. However, it will be understood that the invention is applicable to the transportation and processing of articles generally whether the articles be persons or commodities, and whether the processing be transportation or other material processing operations.

Referring specifically to the drawings, wherein the illustrated embodiments are shown, and wherein like reference numerals refer to like parts throughout:

Fig. 28 is a view of the ticket photographing support table, taken as indicated generally by the line 28—28 of Fig. 14, the table proper being in section;

Fig. 28a is a detail view of the date printing means;

Fig. 28b is a sectional view of the date printing means, on the line 28b—28b of Fig. 28a;

Fig. 29 is a top view of the table structure of Fig. 28;

Fig. 30 is an enlarged sectional view through the table, taken as indicated by the line 30—30 of Fig. 29;

General machine structure

Figure 1:
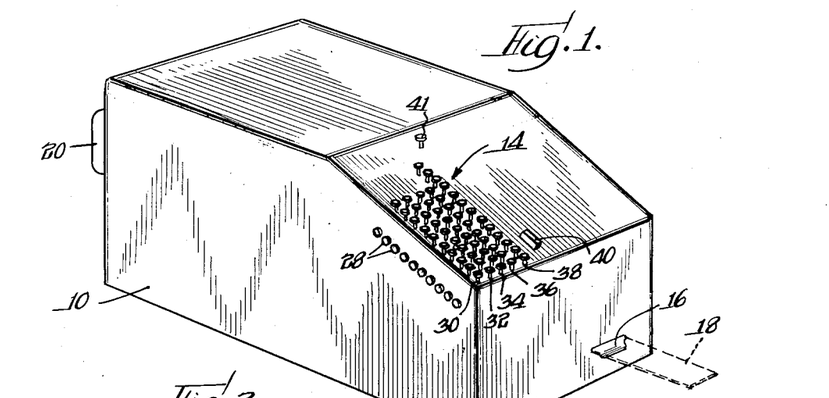
Fig. 1 is a general perspective view of a ticket producing machine constructed in accordance with and embodying the principles of the present invention, in accordance with one preferred embodiment thereof.

The machine, in general, comprises a casing 10, Fig. 1, having at the left forward portion thereof a keyboard generally designated by the reference numeral 14. The photographically reproduced ticket is ejected from the machine through an orifice 16 in the forward face of the machine casing, the ticket being indicated by dotted lines at 18 in Fig. 1. A tally strip is accumulated on a tally roll mechanism partially shown at 20 in Fig. 1, at the rear of the machine, and contains data in punched card form corresponding to the indicia of the photographically reproduced ticket.

Figures 2, 3:
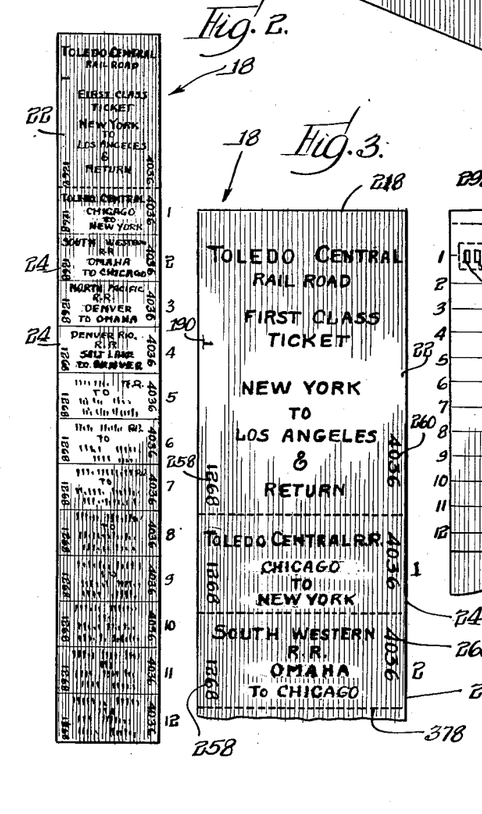
Fig. 2 is a view of one form of ticket, as produced by the machine.
Fig. 3 is an enlarged partial view of the ticket of Fig. 2.

Referring to Figs. 2 and 3, in the particular illustrated embodiment, the ticket which is produced by the machine is a passenger railroad ticket, in conventional form, and comprising a main body portion 22 and a plurality of separable coupons or sections 24, there being twelve such sections in the particular ticket shown. In the use of tickets of this type, as will be understood, the conductor or agent for each carrier railroad detaches the particular ticket section corresponding to such carrier's portion of the route.

Figure 4:
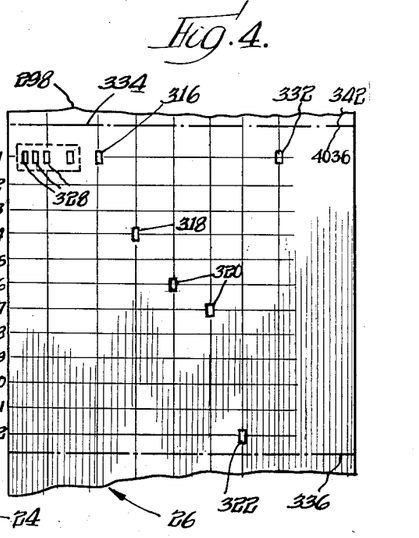
Fig. 4 is a partial view of the tally sheet or strip produced by the machine, and corresponding to the tickets of Figs. 2 and 3.

In Fig. 4 there is shown the tally sheet or strip 26, as provided by the machine. As will be later more particularly described, this tally strip contains punch card data corresponding to the issued passenger ticket 18.

Figure 14:
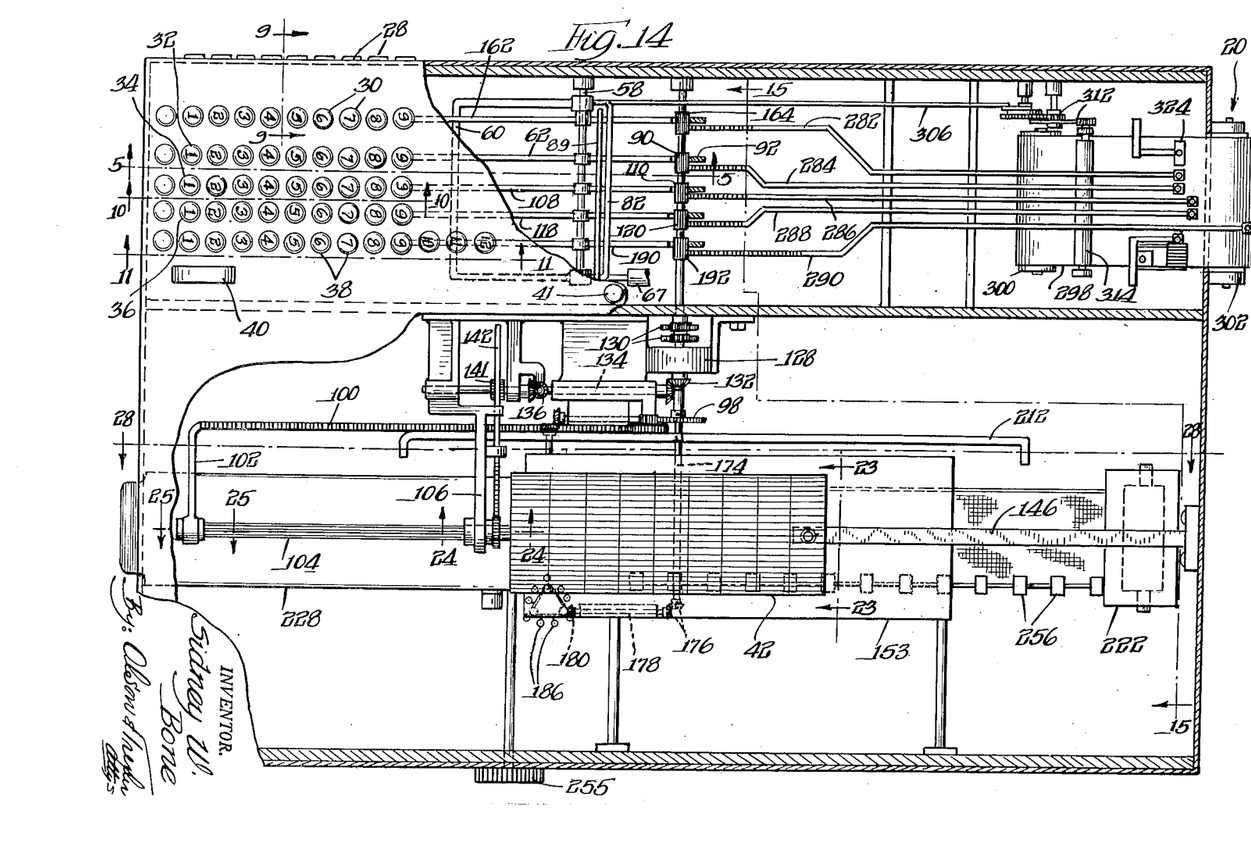
Fig. 14 is a plan view of the machine, parts of the casing being broken away to show the operating parts.

The machine keyboard more particularly comprises a series of key locks 28, Figs. 1 and 14, a bank of operator's keys 30, three banks of selector keys 32, 34 and 36 for selecting the particular ticket to be produced, and a bank of keys 38 for determining the length of the ticket in accordance with its kind or character. There is further provided a machine motor switch 40, and repeat key 41.

In the operation of the machine the operator releases the machine for operation by means of one of the locks 28, and then sets up the machine by manipulation of the keys, and thereafter operates the motor switch 40. Within a few seconds the photographically produced ticket 18 is ejected from the machine in accordance with the key selections made, and the corresponding tally strip 26 correspondingly produced.

Ticket selector mechanism

Figures 22, 23, 24, 25, 26, 27:
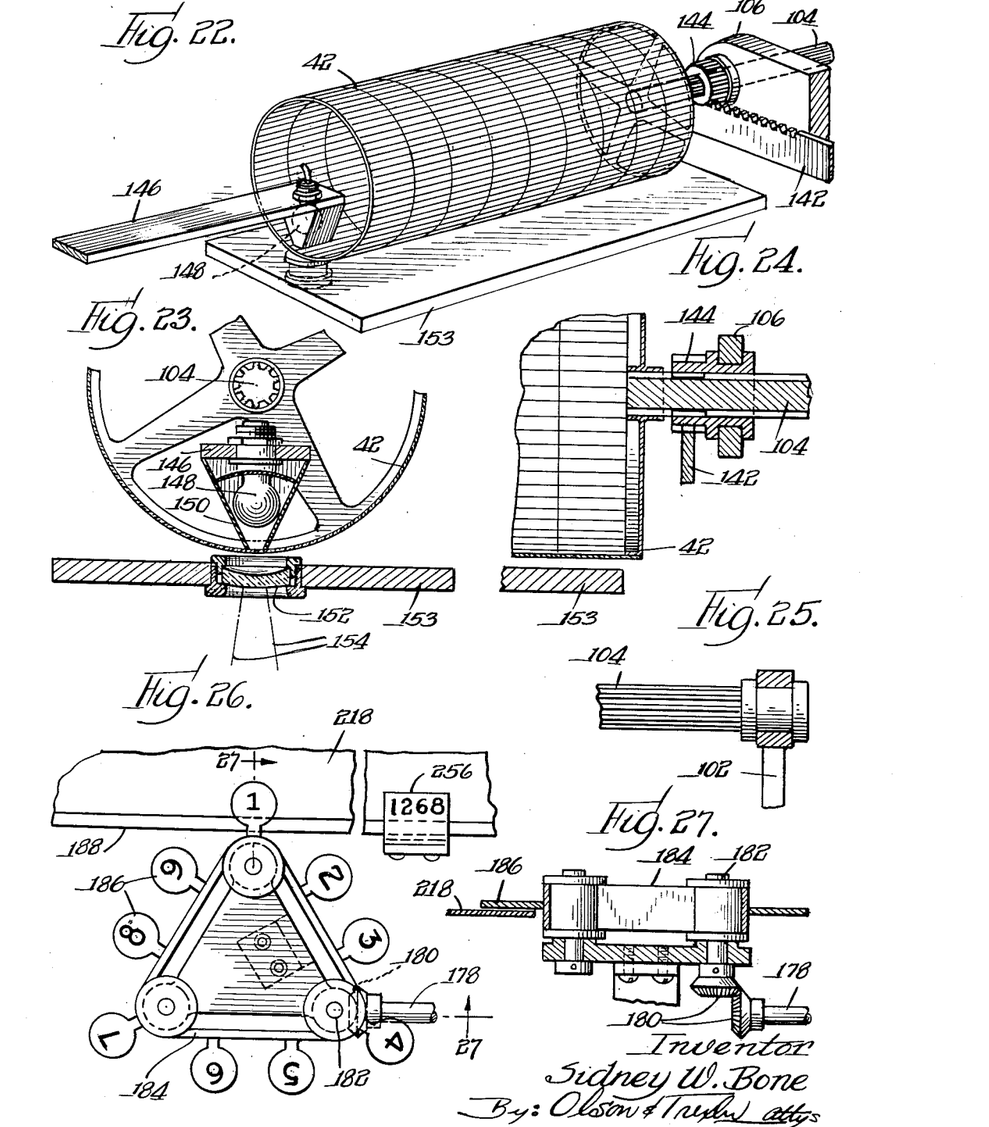
Fig. 22 is a perspective view of the indicia drum forming the reservoir for the multiple ticket indicia.
Fig. 23 is an enlarged sectional view of the drum and associated parts, taken as indicated by the line 23—23 of Fig. 14.
Fig. 24 is a sectional view of a part of the drum mechanism, on the line 24—24 of Fig. 14.
Fig. 25 is a sectional view of a part of the drum drive mechanism, on the line 25—25 of Fig. 14.
Fig. 26 is an enlarged detail view of the operator number reproducing means.
Fig. 27 is a sectional view of the structure of Fig. 26 on the line 27—27 thereof.

In the particular embodiment illustrated the machine is capable of producing any one of eight hundred and ninety-one different tickets by the selective actuation of an indicia reservoir member, which in the particular embodiment shown is in the form of a drum 42, Fig. 22, which is both rotatable and longitudinally shiftable. This drum is provided with nine bands of ticket indicia, there being ninety nine tickets within each band, in the form of microfilms. By means of the selective longitudinal and rotative positioning of the drum, any particular one of the nine hundred and ninety nine tickets may be selected, under control of the keyboard keys. The means for selectively controlling the longitudinal positioning of the drum will first be described.

Figures 5, 6, 7, 8:
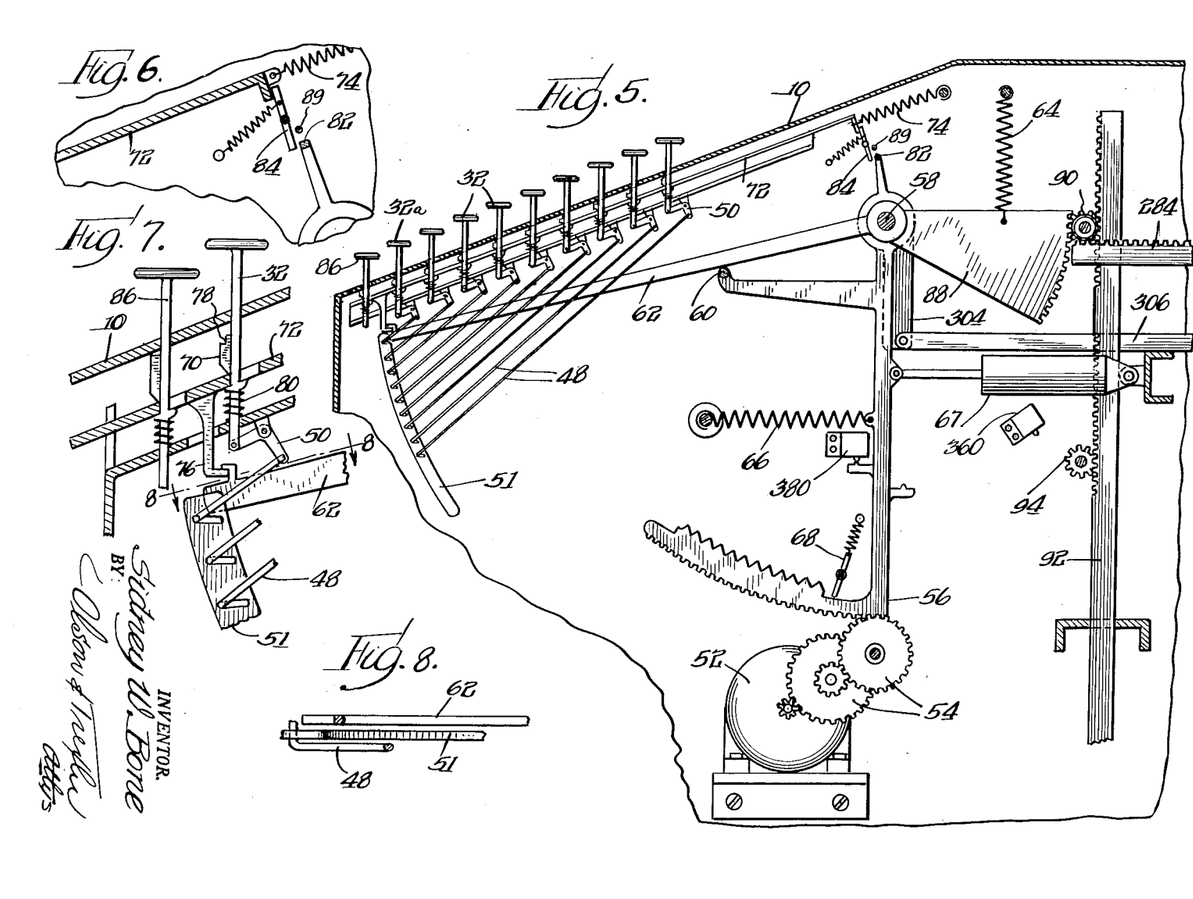
Fig. 5 is a partial sectional view of the machine, and taken as indicated by the line 5—5 of Fig. 14.
Fig. 6 is an enlarged view of a part of the mechanism of Fig. 5.
Fig. 7 is an enlarged detail view, also of a part of the structure shown in Fig. 5.
Fig. 8 is a detail sectional view on the line 8—8 of Fig. 7.

Referring to Fig. 5, wherein the bank of keys 32 for shifting the drum longitudinally is shown, it will be seen that each key is interconnected with a pull wire 48, by means of a bell crank 50, the lower ends of the wires being slidable within suitable slots provided in a wire support member 51, see Figs. 5, 7 and 8.

An electric motor 52, Fig. 5, is arranged by means of gearing 54, to operate a rack 56 in a counterclockwise direction about its pivot 58. A bail 60, Figs. 5 and 14, is rigidly connected to the rack 56 and moves downwardly as the rack is operated counterclockwise. This bail supports a plurality of operating levers, one for each key bank, the lever 62 for the bank of keys 32 being shown in Fig. 5. As the bail 60 is lowered, the operating lever 62 moves downwardly therewith under actuation of an associated operating spring 64, Fig. 5, until the operating lever is stopped by the particular pull wire 48 corresponding to the actuated key. By this means the operating lever 62 is lowered, or moved counterclockwise around the pivot 58, a distance corresponding to the particular key 32 which has been actuated.

When the motor 52 is deenergized, the bail 60 is restored to its position of Fig. 5 by means of a rack return spring 66. A full stroke mechanism is provided as indicated at 68, Fig. 5, for insuring a full stroke of travel of the rack 56, counterclockwise by actuation of the motor 52, and clockwise by the return spring 66.

Referring more particularly to Fig. 7, it will be seen that each key 32 carries a lug 70 arranged to actuate a key bar 72 to the left against the action of a spring 74, Fig 5, so as to actuate a stop 76 to release the operating lever 62 for downward movement. Each key lug 70 has a notch portion 78 for maintaining the key depressed against the action of the key return spring 80. Upon the return stroke of the bail 60, a second bail member 82, Figs. 5 and 6, carried therewith operates a spring latch 84 so as to move the key bar 72 against its spring 74, to release the depressed key. A clear key 86, Fig. 7, is provided for releasing or changing any depressed key 32 before the motor is operated. The repeat key 41, Fig. 12a, operates a bell-crank 87 actuating a bail 89 to disable the latch 84, for repeat operations; the repeat key being held depressed for as long as desired by its holding latch 91.

Figure 15:
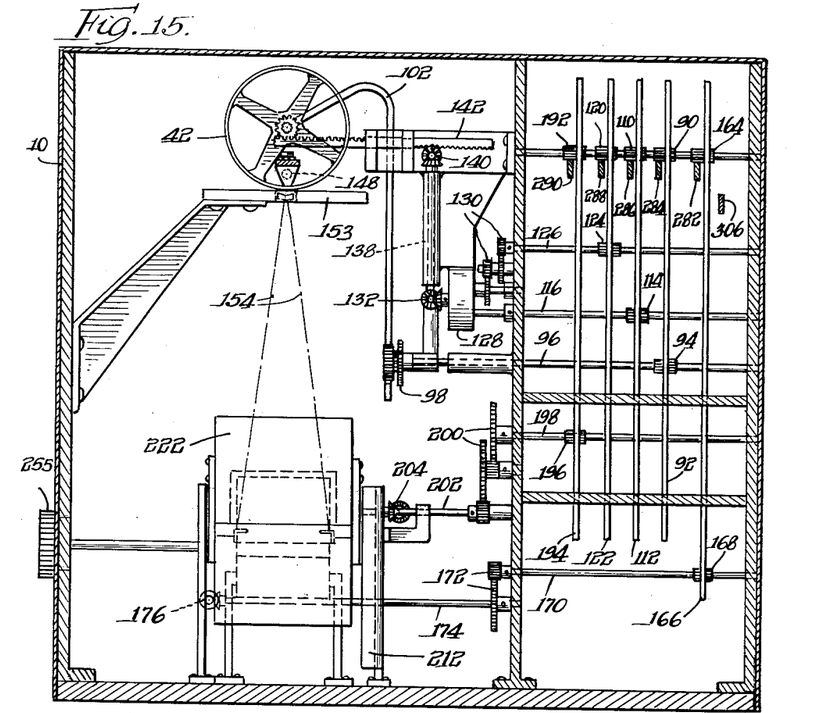
Fig. 15 is a transverse sectional view of the machine, and taken as indicated by the line 15—15 of Fig. 14.

Operating lever 62 is provided at its rear end with a rack sector 88 arranged to operate a pinion 90 in geared engagement with a vertically shiftable rack 92, Figs. 5, 14 and 15.

As best shown in Fig. 15, rack 92 is in geared engagement with a gear 94 secured to a shaft 96 which is arranged by means of gearing 98, Figs. 14 and 15, to effect the longitudinal positioning of an elongated rack member 100. This rack member is rigidly connected to an arm 102, the end of which is rotatably connected to a spline 104, Figs. 14 and 25, formed as a part of the drum member 42. As best shown in Fig. 25, the spline 104 is rotatable relative to the arm 102, but is longitudinally positioned thereby. The splined member is longitudinally slidable within a support bracket 106, Fig. 14.

It will be seen that by reason of the foregoing mechanism, as the machine is cycled by means of the motor switch 40 and motor 52, the indicia reservoir drum 42 will be longitudinally positioned as the motor rack moves counterclockwise, Fig. 5, in accordance with the particular drum selector key 32 which has been depressed. As will be later described, photographic means is provided for reproducing the ticket from the selected microfilm while the drum is thus positioned. As the rack 56 is restored in a clockwise direction by the return spring 66, Fig. 5, and associated dashpot 67, the drum 42 is returned to its normal position as shown in Fig. 14, and the actuated key 32 is released.

The means for rotatably positioning the drum for microfilm selection will now be described. This means comprises the two key banks 34 and 36, cooperable to rotatably position the drum.

Figures 9, 10, 11, 12, 12A, 13:
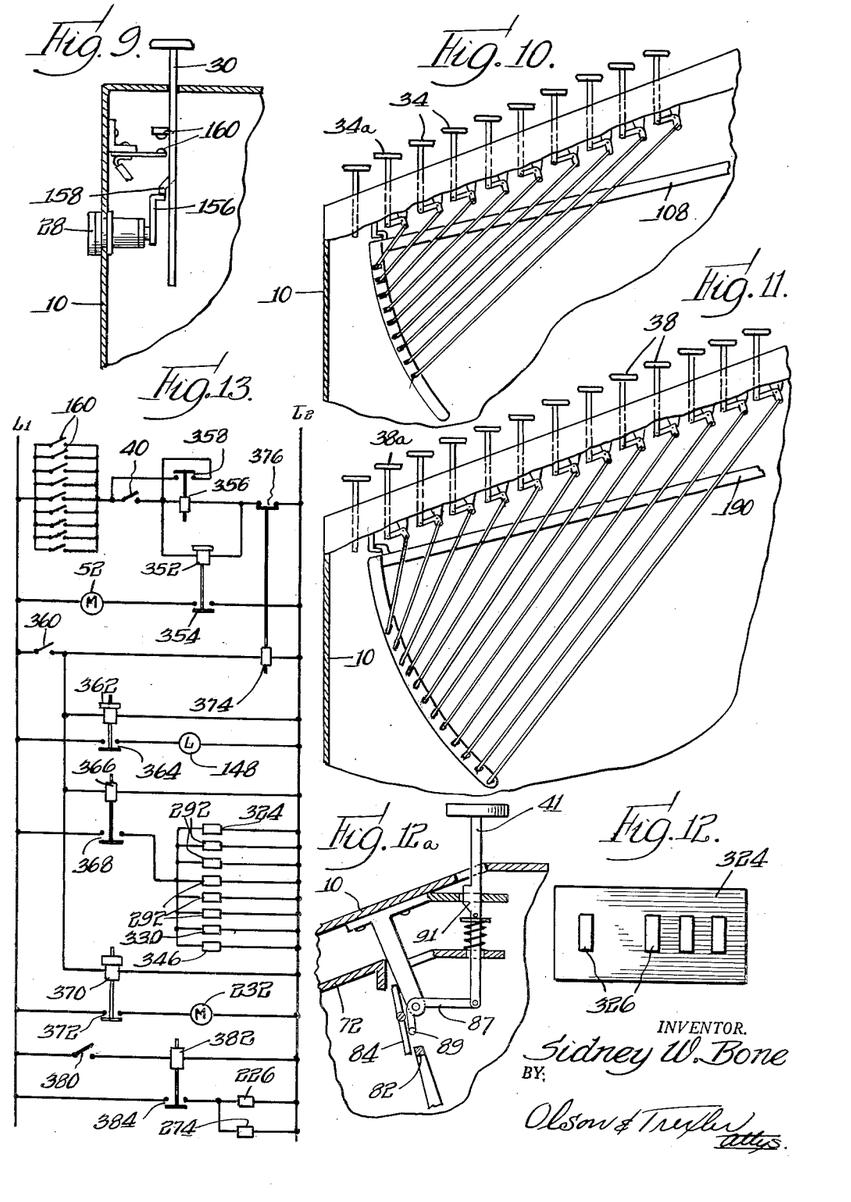
Fig. 9 is a detail view of the locking arrangement for the operator's keys, taken as indicated by the line 9—9 of Fig. 14.
Fig. 10 is a view similar to Fig. 5, and taken on the section line 10—10 of Fig. 14, and illustrating a different bank of keys.
Fig. 11 is also a view similar to Fig. 5 and taken on the line 11—11 of Fig. 14 and illustrating a still further bank of keys forming a part of the machine.
Fig. 12 is a detail view of one of the punch members for the tally sheet.
Fig. 12a is a detail view of the repeat key.
Fig. 13 is a wire diagram of the machine.

The key bank 34 with its associated controlled operating lever 108 is shown in Fig. 10, the arrangement for controlling the movement of an operating lever being essentially the same as previously described in reference to the control of the operating lever 62; except that in this instance when the first key 34a of the bank is operated, the member or lever 108 will undergo one step of movement, whereas in the case of the bank of keys 32 previously described, the first operating key 32a, Fig. 5, does not permit of any movement of the operating lever 62. Both banks of keys 34 and 36 conform to the arrangement shown in Fig. 10.

Referring to Figs. 14 and 15, it will be seen that the operating lever 108 is arranged through the action of a pinion 110 to effect the vertical positioning of a rack 112, this rack being arranged to operate a pinion or gear 114 secured to a shaft 116, Fig. 15.

Similarly the bank of keys 36 is arranged to effect the positioning of a lever 118 which by means of a pinion 120, Figs. 14 and 15, effects the corresponding vertical positioning of a rack 122. Rack 122 operates a gear or pinion 124 secured to a shaft 126, which is connected to a differential 128 through ten to one reduction gearing 130. Shaft 116, previously described, is also connected to the differential 128, the differential thus being arranged to combine the movement of its two inputs, in known manner. By reason of the reduction gearing 130, it will be seen that any movement of shaft 116 produces ten times as much movement of the differential as does a corresponding increment of movement of shaft 126. Thus keybank 34 is in effect a tens order keybank, and keybank 36 is a units order keybank, cooperatively effecting the rotatable positioning of the drum.

The output of the differential 128 is arranged through gearing 132, Figs. 14 and 15, a shaft 134, gearing 136, a shaft 138, gearing 140, and a gear 141, to effect the positioning of the drum rotating or positioning rack 142. This rack, as best shown in Figs. 22 and 24, engages a gear 144 rotatably mounted in the frame bracket 106, and in slidable splined engagement with the spline shaft 104, so that rotation of the gear effects the corresponding rotatable positioning of the spline and the indicia drum in all longitudinal drum positions.

It will be seen that by reason of the connections described, the two keybands 34 and 36, in cooperation, effect the rotation of the indicia drum 42 to a selected one of its ninety-nine operating positions, upon each operation of the machine; while the keybank 32, previously described, similarly effects the longitudinal positioning of the drum; the three keybanks thus being effective to position the drum, at the mid-point in each machine cycle, to any selected one of its nine hundred and ninety-nine operated positions.

Referring further to Figs. 22 and 23, it will be seen that the rotatable indicia drum is associated with a frame bracket or arm 146 carrying a lamp 148 cooperable with a shield 150 and a lens 152 carried by a shield plate 153 in a manner so that when the lamp is lighted the image of the selectively positioned indicia or ticket will be projected as indicated by the broken lines 154, Fig. 23, from the drum onto a photographic printing table, later to be described.

*Operator's keys and control*

Means is provided whereby the machine cannot be cycled except by an authorized operator provided with an appropriate key; and means is further provided so that the operator's number will be printed upon the ticket produced, and also designated on the tally sheet. This mechanism will now be described.

Referring to Figs. 1 and 14, it will be seen that there is one key lock 28 for each operator's key 30. As best shown in Fig. 9, each lock 28, which may be operated only by an authorized operator, is provided with a latch 156 adapted to be rotatably withdrawn from an abutment 158 provided on each key 30, as the lock is operated. Thus it will be seen that no key 30 may be depressed except by an operator provided with an appropriate key or other means for releasing the corresponding lock 28. Each operator's key 30 is arranged to close a pair of switch contacts 160 forming a part of the motor control circuit subsequently to be described, so that the machine cannot be cycled until at least one operator's key 30 has been depressed.

Referring to Figs. 14 and 15, it will be seen that the operator's keys are arranged to selectively position a lever 162 in a manner similar to the positioning of the lever 62, previously described. Lever 162 is arranged to operate a gear 164 which is in turn in engagement with and arranged to effect the selective vertical positioning of a rack 166. This rack is in engagement with a gear or pinion 168, Fig. 15, secured to a shaft 170 which is in turn arranged to actuate gearing 172, a shaft 174, Figs. 14 and 15, bevel gearing 176, a shaft 178, and bevel gearing 180, which is also shown in Fig. 27. The gearing 180 operates a shaft 182, Figs. 26 and 27, arranged to selectively position an endless band 184 which carries a series of nine flags 186 bearing operator's numbers from one to nine inclusive. These flags are transparent except for the numbers carried thereby.

It will be seen that by reason of the connections described, the endless band 184 will be positioned on each operation of the machine, so as to selectively position the corresponding operator's flag over the table 188, Fig. 26, as the key lever 162 reaches its lowermost position at the mid-point in each machine cycle. As will be subsequently described, table 188 carries the photographic paper, the arrangement thus being such as to reproduce on the completed ticket the number of the operator who operated the machine, as shown at 190 in Fig. 3.

*Paper feed and control mechanism*

The conventional railroad passenger transportation ticket is of varying length, depending upon the route to be travelled. Thus in Fig. 2 the ticket illustrated comprises a main body portion 22 and a series of twelve separable ticket stubs 24; but in many instances a lesser number of separable ticket stubs is required. The machine of the present invention is arranged to produce tickets having any desired number of separable ticket stubs from one to twelve, as may be desired. Ordinarily not more than twelve stubs are required. As will be understood, the number of required stubs is related to the particular ticket indicia to be printed from the microfilm drum 42.

The paper feed and control mechanism, in accordance with the foregoing, will now be described.

The paper feed is controlled from the keybank 38, it being intended that the operator will set up the keys on bank 38 in accordance with the particular ticket selected by the keybanks 32, 34 and 36. Thus the operator will be provided with a code book telling him, for any desired ticket, the code number to be used in positioning the indicia drum, and the number of ticket stubs which such ticket requires. For example, for the particular ticket of Figs. 2 and 3, and the tally strip of Fig. 4, the code number is "4" for the keybank 32, "6" for the keybank 34 and "7" for a the keybank 36, and the number of ticket stubs is "12."

It will be seen that there are twelve selector keys 38, as shown in Figs. 14 and 11. Referring particularly to Fig. 11, it will be seen that the keys are adapted to effect the selective positioning of an operating lever 190 in a manner similar to the positioning of the operating lever 62 previously described, except that in the instance of the keys 38 the operating lever is movable to any one of twelve positions, and the initial increment of movement of the lever on operation of the lowest order key 38a is substantial, and accommodates the main body 22 of the ticket, as will presently appear.

As best shown in Figs. 14 and 15, the lever 190 operates a pinion 192 which in turn effects the selective vertical positioning of a rack 194. This rack is in engagement with a gear or pinion 196 secured to a shaft 198 which through gearing 200, Fig. 15, shaft 202, gearing 204, Figs. 15 and 29, a shaft 206, Fig. 29, and bevelled gearing 208 is arranged to operate a shaft 210, shown in Fig. 28, and journalled in the support wall 212. It will be seen that by reason of the connections described, on each cycling operation of the machine, shaft 210 will first be operated in a clockwise direction, as indicated by the arrow in Fig. 28, and then in a counterclockwise direction, a distance corresponding to the particular key 38 which has been depressed.

Figures 28, 28A, 28B, 29, 30:
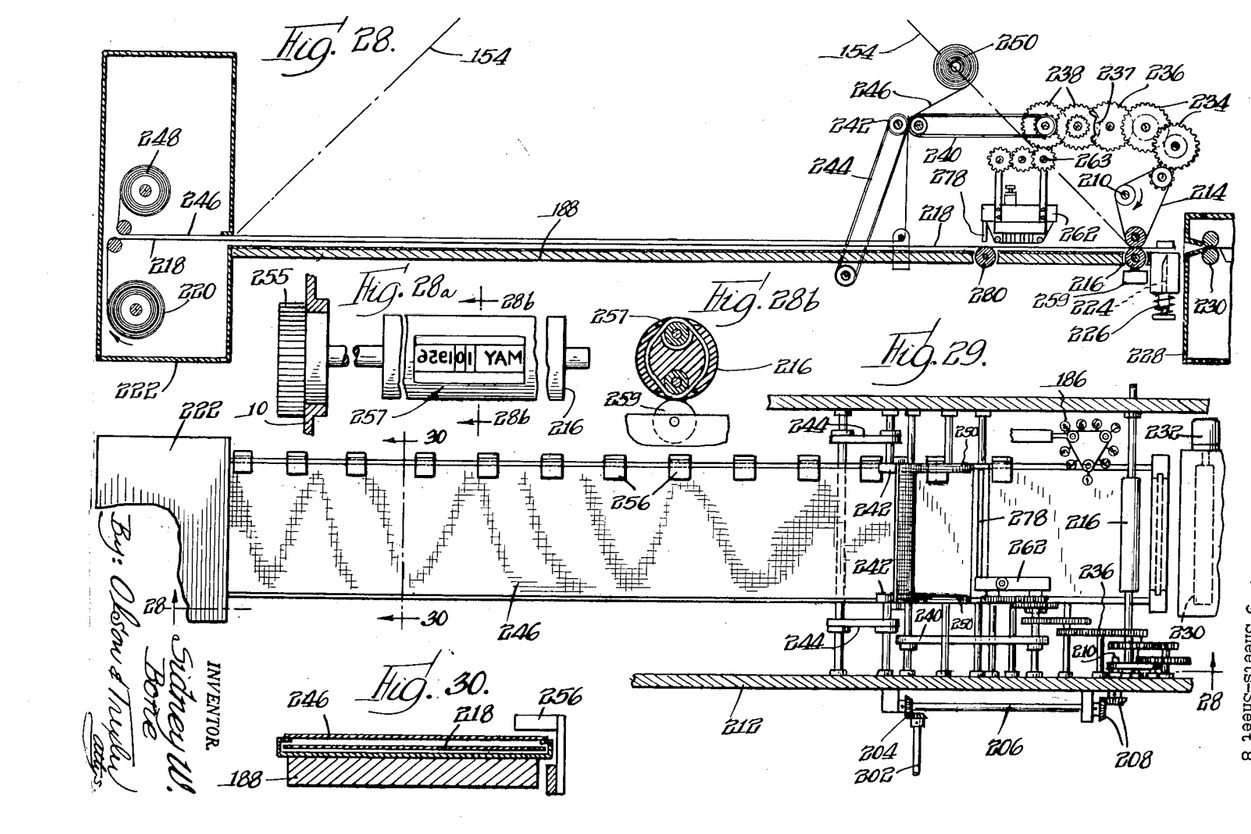

Shaft 210 is arranged by means of a roller secured thereto to operate an endless band 214, Fig. 28. This band or belt, through a one-way clutch, operates a pair of paper feed rolls 216 arranged to feed an elongated strip of photographically sensitized paper 218 along the printing table 188, previously described. The paper is supplied from a supply roll 220 disposed within a light-tight casing 222. The one-way clutch is so constituted that the feed rolls 216 effect the paper feed, to the right as seen in Fig. 28, during the second half of the machine cycle, viz., as the bail 60, Fig. 5, is restored upwardly by the return spring 66.

A cutoff knife 224 actuated from a solenoid 226, Fig. 28, cuts off the paper length at the end of the machine cycle. The cutoff length of paper, after exposure, is fed by the feed rolls 216 into a developing tank or mechanism 228, the details of which form no part of the present invention, viz., several quick developing processes are currently in use for developing photographically exposed sensitized paper within less than one minute's time, any one of which may be used as desired. In Figs. 28 and 29 the feed rolls 230 of the developing apparatus are illustrated for feeding the paper therethrough, which feed rolls are driven by a motor 232 forming a part of an electrical circuit later to be described. As will be understood, the developing apparatus will include the developing solutions, drying apparatus, and spray coating devices for preserving the developed paper ticket, as may be desired.

Referring further to Figs. 28 and 29, it will be seen that the belt 214 drives a speed reducing gear train 234, driving a control gear 236, which in turn drives a speed increasing gear train 238. Gear 236 is provided with a cutaway portion 237 providing a lost motion drive for the gear train 238. The latter through a belt 240, feed rolls 242, and a pair of belts 244, is arranged to drive an elongated shade or screen 246, adapted to overlie the photographic paper 218 on the printing table. One end of this screen is connected to a spring takeup roller 248 within the light-tight casing 222, and the other end of the screen is carried by a pair of spring takeup rollers 250.

Figure 16:
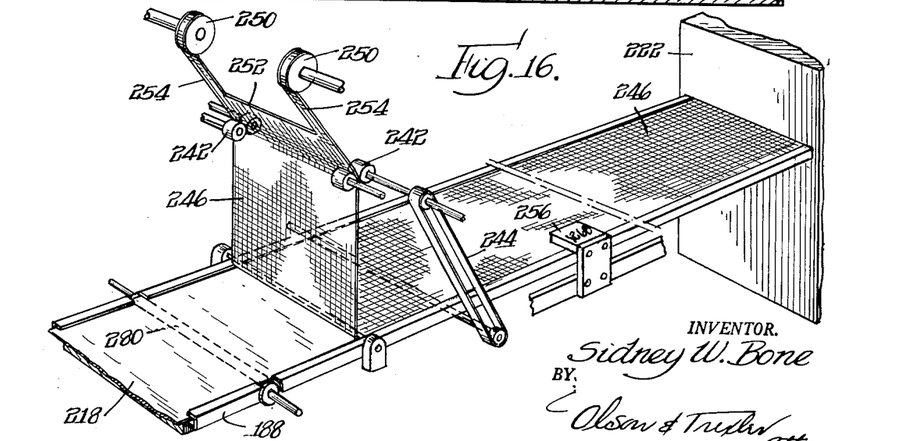
Fig. 16 is a detail perspective view of a part of the ticket photograph table.

As best shown in the perspective view, Fig. 16, the screen 246 is cutaway as indicated at 252 so as to provide side tape portions 254 adapted to be wound on the takeup rollers 250. In the operation of the machine the screen is fed by rollers 242 to the left as seen in Fig. 28 as bail 60, Fig. 5, is lowered a distance corresponding to the depressed key 38, and then restored to the right as seen in Fig. 28, as the bail is raised during the second half of the machine cycle. The screen 246 is opaque, and the cutaway portion 252, Fig. 16, is so positioned in respect to the lost motion drive 237, as to uncover a proper amount of paper on the photographing or printing table. Thus if the number 12 key in the keybank 38 is depressed, the screen will be moved sufficiently to the left as seen in Fig. 28 so as to uncover sufficient paper corresponding to twelve coupons 24, Fig. 2, at the mid machine cycle; and similarly a lesser amount of paper is uncovered by the screen for any ticket requiring a corresponding lesser number of coupons, by depression of a lower number key. The microfilms of the film drum 42 will be opaque beyond the range of the coupons to be printed for a particular ticket. The use of the screen 246 insures that the non-used portion of the paper lying on the printing table during the photographing operation will remain covered and thus not exposed to any stray light which would tend to desensitize the paper for the subsequent operation of the machine.

Date printing

As shown in Figs. 28a and 28b, paper feed roll 216 is removable from the machine by its handle 255, and is provided with manually settable date printing mechanism 257 cooperable with inking mechanism 259. By this means any desired date may be printed on the rear face of the ticket at spaced intervals as it is ejected.

Ticket number and machine indicia printing mechanism.

Means is provided for printing on each ticket a number identifying the machine; and also an individual ticket number for each ticket.

The machine serial number printing is effected photographically by a series of block members 256, Fig. 29, there being one such block member for the ticket body portion, and one block member for each coupon; whereby a machine identifying number or indicia 258 is printed on the ticket body 22, and on each separable coupon 24. As best shown in Fig. 26, each block member 256 is supported along the length of the printing table 188, and comprises a transparent glass plate upon which the machine identifying indicia is printed, whereby upon operation of lamp 148 the indicia is photographically reproduced on the paper along with the image of the microfilm from the drum 42.

The ticket serial number 260 is also printed on the ticket body portion, and also on each separable coupon, as will be seen by reference to Fig. 3. This printing is effected by a printing impressing operation rather than photographically, by means best shown in Figs. 28, 29, 31 and 32.

Figure 31:
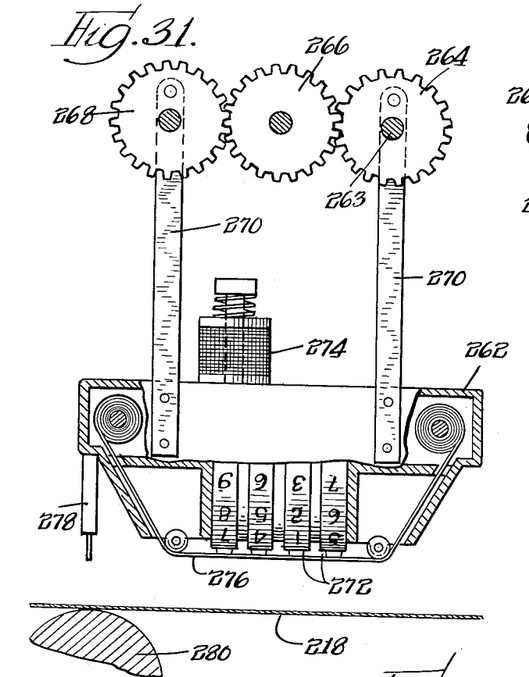
Fig. 31 is an enlarged detail view of the printing counter, forming a part of the table structure.
Figure 32:
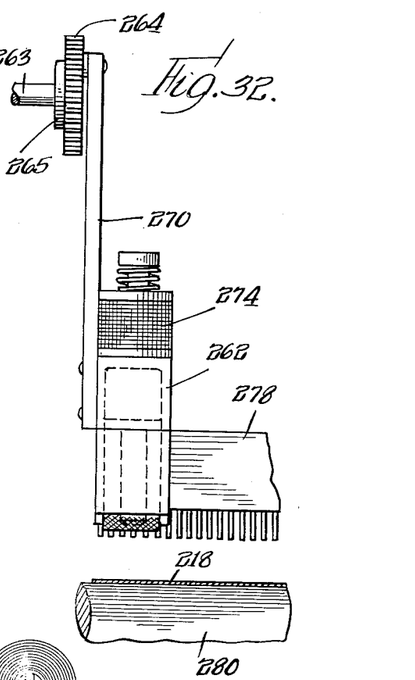
Fig. 32 is a side view of the structure of Fig. 31.

The serial number printing device 262 is driven from the gear train 238, Fig. 28, through the intermediary of a shaft 263, Figs. 28, 31 and 32, driven thereby. A gear 264 is mounted on the shaft by means of a one-way clutch 265, and this gear meshes with a pair of gears 266 and 268. The gears 264, 266 and 268 are mounted on shafts supported by the frame bracket 212, Fig. 29. Gears 264 and 268 are provided with depending arms 270 journalled to the gears at their upper ends, so that as the gears are rotated an orbital motion is imparted to the printing frame 262 which thus moves in an orbital path at a lineal speed corresponding to the speed of movement of the paper 218. By reason of the one-way clutch 265 such motion is imparted to the printing frame 262 only during the second half of the machine cycle, viz., as the paper 218 is being fed to the right in Fig. 28 and as the bail 60, Fig. 5, is being raised by the return spring 66. The lost motion connection 237 also functions so that motion is imparted to the printing frame 262 so as to make a single impression for the body portion 22 of the ticket, Fig. 3, and one impression for each coupon 24.

The printing frame is provided with printing numeral wheels 272, Fig. 31, interconnected by conventional transfer mechanism operated from a solenoid 274, the arrangement being such that upon each operation of the solenoid, at the end of the machine cycle, one increment or step of movement is imparted to the numeral wheels. The printing frame is also provided with a conventional ink ribbon 276, and associated mechanism; and with a perforator 278 which provides perforations for each separable ticket coupon. The perforator cooperates with a sponge roller 280, Fig. 28, provided beneath the paper.

Tally strip mechanism

As previously mentioned, an important aspect of the present invention is the provision of means for providing a tally strip or card, in punch card form, corresponding to each ticket photographically produced and issued from the machine. The tally strip mechanism is shown in Fig. 14, and in detail in Figs. 17–21. A tally strip portion is shown in Fig. 4.

Figure 17:
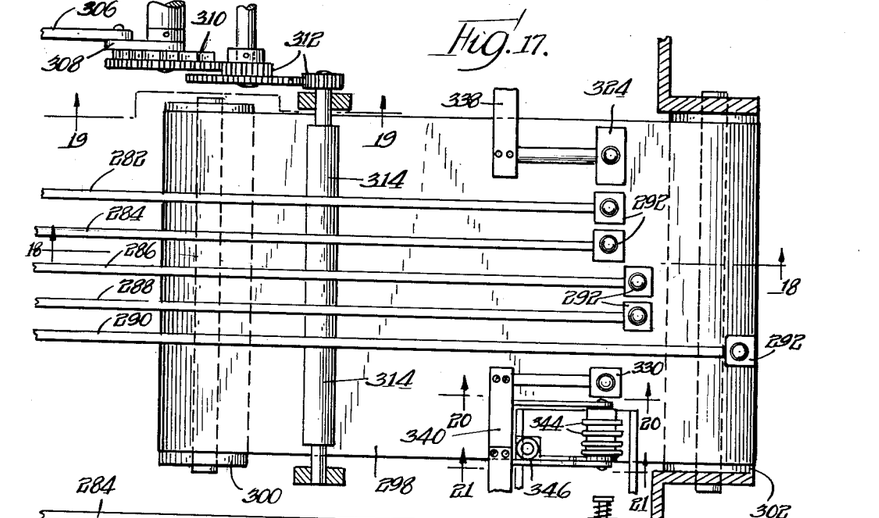
Fig. 17 is an enlarged view of a part of the structure shown in Fig. 14, and more particularly illustrating the tally sheet punching mechanism.

Referring to Figs. 14 and 15, it will be seen that gear 164 corresponding to the operator's number, gear 90 which longitudinally shifts the microfilm drum, gears 110 and 120 which control the rotation of the drum, and gear 192 which controls the paper feed and screen mechanism in accordance with the length of ticket to be produced, act to horizontally position a series of racks 282, 284, 286, 288 and 290 corresponding to and simultaneously positioned with the vertically operable racks 166, 92, 112, 122 and 194, respectively, as previously described. As best shown in Fig. 17, these several horizontally positioned racks carry electromagnetically operated punching devices 292 at their ends, which punching devices are cooperable with suitably positioned perforations 294, Fig. 18, in a table 296 over which the tally sheet 298 is adapted to be fed from a supply roll 300 to a spring takeup roll 302.

Figures 18, 19, 20, 21:
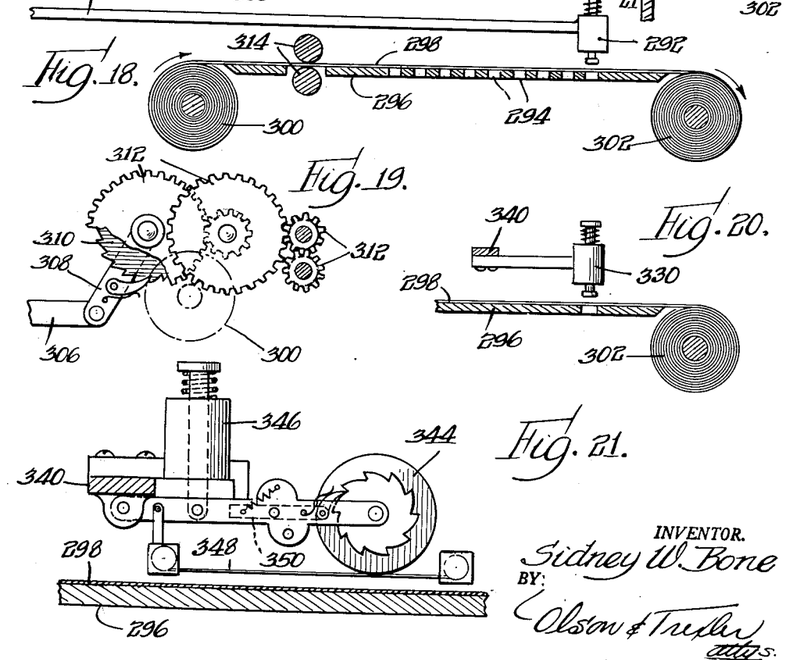
Fig. 18 is a sectional view of the structure of Fig. 17 on the line 18—18 thereof.
Fig. 19 is a detail sectional view on the line 19—19 of Fig. 17.
Fig. 20 is a detail sectional view on the line 20—20 of Fig. 17.
Fig. 21 is a detail sectional view on the line 21—21 of Fig. 17.

Means is provided for feeding a predetermined length of the tally strip paper over the table on each operation of the machine. Referring to Fig. 5, it will be seen that the main rack arm 56 has integral therewith an arm 304 arranged to operate a horizontally reciprocable link 306 upon each cycle of the machine. As shown in Figs. 17 and 19, this link operates a pawl arm 308 cooperable with a ratchet 310 which is in turn arranged to actuate gearing 312 in a manner so as to impart a predetermined increment of rotation to a pair of feed rolls 314 during the forward stroke of the main rack 56, viz., during the first half of the machine cycle, while the rack 56 is being operated in a counterclockwise direction by the main drive motor 52. By reason of the connections described, a predetermined length of the tally strip is fed over the table 296 upon each cycle of operation of the machine; and at the mid point in the cycle of operation, simultaneously as the photographic lamp 148 is operated, the several electromagnetic punch devices 292 are actuated so as to perforate the tally strip in accordance with the variable rack positioning, and corresponding to the particular drum microfilm being exposed. Such perforations are shown in the tally strip in Fig. 4, the perforation 316 indicating operator No. 1, the perforation 318 and the perforations 320 indicating selection of the particular microfilm in the fourth longitudinal row and in the sixty-seventh rotative position of the microfilm drum, and the perforation 322 indicating that such particular ticket being photographically produced is provided with twelve separable coupons.

The tally mechanism further includes a code electromagnetically operated punch 324, Figs. 17 and 12, provided with a series of punches 326 positioned in the form of a code whereby to perforate the tally strip with a code symbol 328, Fig. 4, which corresponds with the visual identifying indicia 258 provided on the ticket, identifying the particular machine from which the ticket is issued.

There is still further provided an electromagnetically operated punch 330, Figs. 17 and 20, operable along with the punches 292 and 324, for producing a perforation 332 in the tally strip, Fig. 4, as a reference perforation from which the tally strip may, if desired, be cut into individual punch cards, as indicated by the lines 334 and 336 in Fig. 4 in a suitable punch controlled cutting machine.

As will be understood, the electromagnetic punches 324 and 330 are fixed to the frame of the machine as by suitable supporting frame brackets 338 and 340, respectively.

Means is provided for printing visual indicia 342, Fig. 4, on the tally strip, corresponding to the visual ticket number indicia 260 provided on the issued ticket. This means, as shown in Figs. 17 and 21, comprises a series of printing numeral wheels 344 interconnected by conventional transfer mechanism, and adapted to be brought downwardly into engagement with the paper to effect a printing operation, by means of an electromagnet 346. An inking ribbon 348 is provided, and there is also provided a pawl arm 350 arranged to impart a step of movement to the lowest order printing wheel upon each printing impression.

*Operation and wiring diagram*

The wiring diagram for the machine is shown in Fig. 13.

In the machine operation, the operator first inserts his key in one of the locks 28, then operates the corresponding operator's key 30 which has been released for actuation, and also selects the microfilm and the appropriate ticket length by manipulation of the key banks 32, 34, 36 and 38. As will be understood, the operator is provided with a code book or the like in which the proper key coding will be given for the particular ticket to be produced.

The operator then actuates the motor bar or switch 40. If one of the operator key switches 160 has been closed, the operation of switch 40, Fig. 13, energizes a relay coil 352 closing relay contacts 354 whereby to energize the main drive motor 52 of the machine. Closing switch 40 also energizes a relay coil 356 closing a set of contacts 358 establishing a holding circuit around the switch 40 whereby to maintain switch 354 closed upon release of the operator's button switch 40.

As the motor 52 is operated the rack 56, Fig. 5, is moved counterclockwise feeding the tally strip 298 and lowering the bail 60, whereupon the operating lever 162 acts to position the appropriate operator's flag 186, Fig. 26; lever 62 operates to longitudinally position the microfilm drum 42, levers 108 and 118 collectively operate to position the microfilm drum rotatably; and lever 190 operates to move the screen 246 so as to expose an appropriate length of paper corresponding to the particular microfilm to be reproduced. Simultaneously the several racks 282, 284, 286, 288 and 290 of the tally strip mechanism are differentially positioned in accordance with the data set up upon the keyboard, and the microfilm selected.

As the rack 56 reaches fully operated position in counterclockwise direction, Fig. 5, lowering the bail 60 to the limit of its movement, the rack engages and momentarily operates a limit switch 360, Figs. 5 and 13. Closing of switch 360 operates a relay solenoid 362, Fig. 13, closing switch contacts 364, thereby energizing the photographic lamp 148. Solenoid 362 is an adjustable slow release solenoid coil whereby the lamp may be maintained lighted an adjustable selected length of time in accordance with the photographic requirements. As will be understood, the energization of the lamp photographically exposes the ticket paper 218 on the table 188 through the selected microfilm, whereby to reproduce the selected ticket on the ticket paper. Simultaneously the machine symbol 258, Fig. 3, is photographically reproduced by the several symbol printing blocks 256. The operator's number 190, Fig. 3, is also reproduced on the body of the ticket by means of the appropriately positioned flag 186.

The closing of limit switch 360 also energizes a solenoid coil 366, closing switch contacts 368 whereby to energize the several punch and printing solenoids 324, 292, 330 and 346 of the tally strip mechanism. The actuation of these solenoids appropriately punches the tally strip with the machine code number 328, Fig. 4, the cutting reference perforation 332, the several perforations 316, 318, 320 and 322 corresponding to the particular ticket selected, and prints the visual ticket number 342.

The closing of limit switch 360 also energizes a relay coil 370, closing switch contacts 372 whereby to energize the motor 232, Fig. 29, which drives the feed rolls of the processing mechanism 228. Solenoid 370 is a very slow release solenoid as indicated in Fig. 13 whereby the motor 232 when once energized remains in operation for a minute or more so as to insure proper feeding of the paper through the processing mechanism 228, upon delivery of the paper thereto.

The closing of limit switch 360 also energizes a relay coil 374, Fig. 13, opening switch contacts 376 which deenergizes coils 356 and 352. Deenergization of coil 356 opens contacts 358 breaking the holding circuit around switch 40, and deenergization of coil 352 opens contacts 354 deenergizing the main drive motor 52. However, coil 352 is of the slow release type so that contacts 354 remain closed sufficiently long to effect the foregoing punching and photographic operations, before motor 52 is deenergized.

Deenergization of motor 52 effects the restoring clockwise movement of rack 56 under actuation of the main return spring 66, Fig. 5, and the dashpot 67 which limits the speed of operation. As bail 60 is restored upwardly with the return movement of rack 56, the several key levers are restored to home position thus restoring to home position the microfilm drum 42 and the operator's flags 186.

As the bail 60 is raised, and the lever 190 of the keys 38 is restored, the paper feed rolls 216, Fig. 28, are operated to feed the now exposed ticket paper 218 into the feed rolls 230 of the processing mechanism 228; and simultaneously the screen 246 is returned to home position, and the printing frame 262, Figs. 28 and 31, is cycled an appropriate number of times so as to print the ticket number indicia 260 onto the body 22 and coupons 24, and at the same time cause the perforating device 278 to effect the corresponding perforations 378. As the paper is fed from the printing table, printing means 257, Fig. 28a, prints the desired date at spaced intervals on the rear face of the ticket. As will be understood, the amount of paper feed and the number of cycles of movement imparted to the printing and perforating frame 262 corresponds to the ticket length, viz., to the particular number of coupons provided on the particular ticket corresponding to the microfilm selected.

As the rack 56 is restored to home position a limit switch 380, Figs. 5 and 13, is momentarily operated thereby, whereby to energize a relay coil 382, closing switch contacts 384. The closing of these switch contacts energizes the electromagnet 226, Fig. 28, of the paper cutter and the solenoid 274, Fig. 31, of the printing frame 262, thus imparting an increment of movement to the printing numeral wheels 272 to condition them for the subsequent machine operation. By means of repeat key 41, several identical tickets may be produced without resetting the machine keys.

It will be seen that by means of the machine provided, any one of a large number of tickets may be photographically produced by selection from a reservoir of microfilms corresponding to a large number of different desired ticket coupons, routings, or other processing operations. By rapidly operable processing operations the tickets are issued from the machine in a short period of time. The issued ticket carries the indicia of the particular routing, taken from the appropriate microfilm; it is of a selected length in accordance with the particular routing or processing, and it carries a serial number on the body and on each separable coupon; as well as identifying indicia of the particular machine from which the ticket was derived, and of the operator. Readily separable coupons are provided.

At the same time a tally strip in punch card form is provided corresponding to the issued ticket. This tally strip carries a reference punch from which a cutting machine may be controlled to provide individual punch cards. These cards carry a visual serial number, and also a reference punch of the particular machine corresponding to the tally strip, as well as reference punches corresponding to the ticket which has been produced. The tally strip card may be readily processed through punched card accounting machines in accordance with the code designations perforated thereon whereby to quickly ascertain a variety of information for accounting purposes as, for example, a prorating of the revenue due different carriers for the tickets produced, the total sales, or the sales of a particular kind of ticket, or from a particular machine, or a variety of other data conventionally obtained only by laborious manual operations with incident possibilities of error.

*Modified photographic processing*

Figure 33:
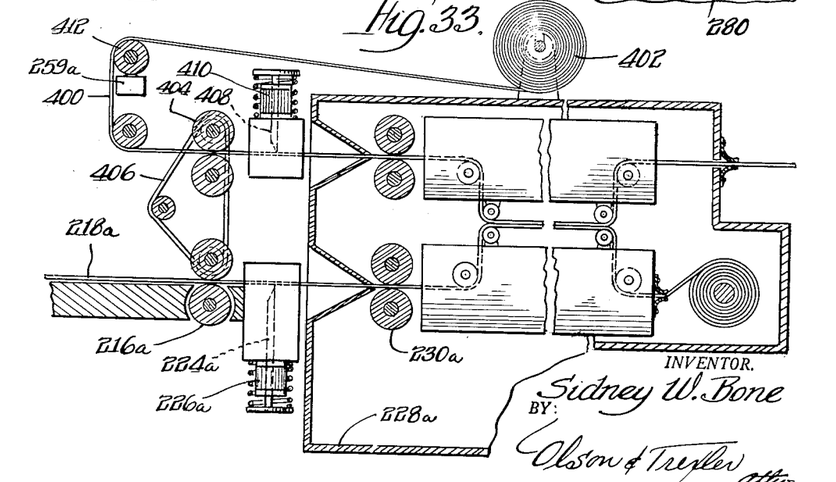
Fig. 33 is a view of a modified arrangement for effecting the photographic processing.

In accordance with the embodiment of the invention previously described the photographically exposed ticket paper is directly developed within and delivered from the processing apparatus 228. In Fig. 33 a modified arrangement is illustrated, adapted to the transfer type of developing or processing operation.

In this instance the photographically exposed paper strip 218a, corresponding to the paper strip 218 previously described, is severed by knife 224a and arranged to be fed into the developing or processing tank 228a as previously described.

However, in this instance a second paper strip 400 is fed from a supply roll 402 by a set of feed rolls 404 operated with the feed rolls 216a by means of a feed belt 406; there being a knife 408 controlled by a solenoid 410 for the paper strip 400, the knives 408 and 224a being electrically arranged for simultaneous actuation. The paper strips 218a and 400 are thus simultaneously fed into the developing and processing apparatus or tank 228a in corresponding lengths; and therein may be subjected to a transfer type processing operation sometimes desirable in quick photographic developing. In such transfer type processing the strip 400 will comprise the issued ticket, the exposed strip 218a being discarded, as indicated in Fig. 33. Roll 412 may be removable and provided with date printing means similar to the printing means 257 of the feed roll 216 previously described.

Thus the machine is adapted to different types of photographic and processing operations, as may be desired.

It is obvious that various changes may be made in the specific embodiments of the invention heretofore set forth without departing from the spirit of the invention. The invention is accordingly not to be limited to the specific structures shown and described, but only as indicated in the following claims.

The invention is hereby claimed as follows:

1. A ticket producing machine comprising a plurality of films forming a reservoir of indicia photographically representative of a plurality of tickets to be produced, selector means, photographic ticket producing means, means controlled by the selector means for actuating the ticket producing means to photographically reproduce said indicia to effect the production of a selected ticket from said reservoir of indicia, auxiliary indicia applying means operatively associated with said films and said ticket producing means for applying auxiliary indicia to said ticket as an incident to the operation of said ticket producing means, and ticket issuing means operatively associated with said ticket producing means for issuing individual tickets so produced.

2. A ticket producing machine comprising means forming a reservoir of indicia for a plurality of tickets to be produced, said reservoir comprising a member movable to a plurality of positions to selectively position film indicia carried thereby, selector means for selectively positioning said member, photographic ticket producing means, and means for actuating the ticket producing means photographically to reproduce said indicia to effect the production of a selected ticket from said reservoir member, auxiliary indicia applying means operatively associated with said films and said ticket producing means for applying auxiliary indicia to said ticket as an incident to the operation of said ticket producing means, and ticket issuing means operatively associated with said ticket producing means for issuing individual tickets so produced.

3. A ticket producing machine comprising a plurality of films forming a reservoir of indicia for a plurality of tickets to be produced, selector means, photographic ticket producing means, means controlled by the selector means for actuating the ticket producing means photographically to reproduce said indicia to effect the production of a selected ticket from said reservoir of indicia, means operatively associated with the ticket producing means for issuing individual tickets so produced, and means controlled by the selector means for producing a tally member provided with indicia in accordance with the ticket produced.

4. A ticket producing machine as defined in claim 3, wherein said tally member comprises a punched card.

5. A ticket producing machine comprising means forming a reservoir of indicia for a plurality of tickets to be produced, said reservoir comprising a member movable to a plurality of positions to selectively position film indicia carried thereby, selector means for selectively positioning said member, photographic ticket producing means, means for actuating the ticket producing means photographically to reproduce said indicia to effect the production of a selected ticket from said reservoir member, means for issuing individual tickets so produced, and means controlled by the selector means for producing a tally sheet provided with indicia in accordance with the ticket produced.

6. A ticket producing machine as defined in claim 1, wherein said auxiliary indicia applying means comprises means operable to provide machine identifying indicia on the ticket produced.

7. A ticket producing machine as defined in claim 1, wherein said auxiliary indicia applying means comprises means operable to provide a ticket serial number on the ticket produced.

8. A ticket producing machine as defined in claim 3, wherein there is means operable to provide machine identifying indicia on said tally member.

9. A ticket producing machine as defined in claim 3, wherein there is means operable to provide a ticket serial number on said tally member.

10. A ticket producing machine as defined in claim 1, wherein said auxiliary indicia applying means comprises photographic means for providing machine identifying indicia on the ticket, and mechanical means for providing a ticket serial number on said ticket.

11. A ticket producing machine as defined in claim 3, wherein the tally member is in punched card form, and wherein there is means for impressing a visual ticket serial number upon the tally member.

12. A ticket producing machine as defined in claim 1, wherein means is provided for adjusting the length of the ticket in accordance with the indicia provided thereon.

13. A ticket producing machine comprising means forming a reservoir of films having indicia corresponding to a plurality of different size tickets to be produced, means for selecting one of said films, and photographic means operable to effect the photographic production of a selected one of said films to produce a ticket from said selected film, and ticket issuing means operatively associated with the photographic means for issuing individual tickets upon each operation of said photographic means, said ticket issuing means comprising perforating means, mechanical printing means, and photographic developing means.

14. A ticket producing machine comprising means forming a reservoir of films having indicia corresponding to a plurality of differing size tickets to be produced, selector means for selecting one of said films, photographic means including means for variably feeding photographic material operable to effect the photographic production of a ticket from said selected film, and means controlled by said selector means for adjustably controlling the feeding means for thereby adjusting the size of the produced ticket in accordance with the indicia carried thereby.

15. A ticket producing machine comprising means forming a reservoir of films having indicia corresponding to a plurality of different tickets to be produced, selector means operable for selecting one of said films, photographic means operable to effect the photographic production of a ticket from said selected film, ticket issuing means controlled by the operation of the selector means, and tally mechanism controlled by the operation of said selector means for effecting the production of a tally member in accordance with the indicia of the ticket produced.

References Cited in the file of this patent

UNITED STATES PATENTS

| | | |
|---|---|---|
| 1,320,680 | Forth | Nov. 4, 1919 |
| 1,382,637 | Fuller | June 28, 1921 |
| 1,746,704 | Koch | Feb. 11, 1930 |
| 1,838,389 | Goldberg | Dec. 29, 1931 |
| 2,146,834 | McCain | Feb. 14, 1939 |
| 2,323,372 | Bryce | July 6, 1943 |
| 2,357,674 | McConnell et al. | Sept. 5, 1944 |
| 2,364,188 | Bryce | Dec. 5, 1944 |
| 2,521,667 | Neyhart | Sept. 5, 1950 |
| 2,607,264 | Gazza | Aug. 19, 1952 |
| 2,668,009 | Schmidt | Feb. 2, 1954 |
| 2,735,335 | Shaw | Feb. 21, 1956 |
| 2,764,059 | Bottoms | Sept. 25, 1956 |
| 2,820,404 | Chung Shu Kwei | Jan. 21, 1958 |